(12) United States Patent
Nagasaka

(10) Patent No.: US 12,151,944 B2
(45) Date of Patent: *Nov. 26, 2024

(54) DEVICE AND METHOD FOR PRODUCING TETRAHYDROBORATE

(71) Applicant: SINTOKOGIO, LTD., Nagoya (JP)

(72) Inventor: Masahiko Nagasaka, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 706 days.

This patent is subject to a terminal disclaimer.

(21) Appl. No.: 17/437,942

(22) PCT Filed: Nov. 15, 2019

(86) PCT No.: PCT/JP2019/044954
§ 371 (c)(1),
(2) Date: Sep. 10, 2021

(87) PCT Pub. No.: WO2020/188879
PCT Pub. Date: Sep. 24, 2020

(65) Prior Publication Data
US 2022/0169504 A1    Jun. 2, 2022

(30) Foreign Application Priority Data
Mar. 19, 2019    (JP) .................................. 2019-050955

(51) Int. Cl.
*C01B 6/21*    (2006.01)
*B01J 19/00*    (2006.01)
*B01J 19/12*    (2006.01)

(52) U.S. Cl.
CPC .............. *C01B 6/21* (2013.01); *B01J 19/0046* (2013.01); *B01J 19/126* (2013.01); *C01P 2004/61* (2013.01)

(58) Field of Classification Search
CPC ........ C01B 6/21; B01J 19/0046; B01J 19/126
See application file for complete search history.

(56) References Cited

U.S. PATENT DOCUMENTS

| | | | |
|---|---|---|---|
| 2008/0233723 A1 | 9/2008 | Okumura et al. | |
| 2013/0122266 A1 | 5/2013 | Kane et al. | |
| 2017/0183236 A1 | 6/2017 | Yoshizaki | |

FOREIGN PATENT DOCUMENTS

| | | |
|---|---|---|
| CN | 101356625 A | 1/2009 |
| CN | 104039923 A | 9/2014 |
| CN | 204389395 U | 6/2015 |
| CN | 106414314 A | 2/2017 |
| CN | 108862188 A | 11/2018 |
| CN | 109937197 A | 6/2019 |
| JP | 2004-224593 A | 8/2004 |
| JP | 2004-224684 A | 8/2004 |
| JP | 2005-097047 A | 4/2005 |
| JP | 2006-298734 A | 11/2006 |
| WO | WO-2015/190403 A1 | 12/2015 |
| WO | WO-2019/003663 A1 | 1/2019 |
| WO | WO-2019/198325 A1 | 10/2019 |

OTHER PUBLICATIONS

Takahashi et al., Proceedings of 36th Symposium on Plasma Processing (SPP36)/ 31th Symposium on Plasma Science for Materials (SPSM31), Jan. 15, 2019. (Applicant disclosed it).*
Takahashi et al., "Recycling of Sodium Metaborate to Sodium Borohydride by Hydrogen Plasma Treatment," Proceedings of 36th Symposium on Plasma Processing (SPP36) / 31st Symposium on Plasma Science for Materials (SPSM31), Jan. 15, 2019, p. 138-p. 139.
Takahashi et al., "Recycling of Sodium Metaborate to Sodium Borohydride by Hydrogen and Hydrocarbon Gas Mixture Plasma," Proceedings of the 66th JSAP Spring Meeting, 2019, Official Guidebook, Mar. 10, 2019,11a-PA7-7 (with English translation).
International Preliminary Report on Patentability mailed Sep. 30, 2021 in International Application No. PCT/JP2019/044954.
Al Si-qi, Qi Chun-lei, Zhang Si-yuan, "Study on Preparation and Properties of Sodium Hydrogen Storage Materials," Journal of Jilin Institute of Chemical Technology, vol. 32, No. 8, Aug. 15, 2015, p. 21-p. 23, including English-language abstract.

* cited by examiner

Primary Examiner — Yong L Chu
(74) Attorney, Agent, or Firm — Faegre Drinker Biddle & Reath LLP

(57) ABSTRACT

A device for producing a tetrahydroborate, the device including a reaction chamber inside which a hydrogen plasma is generated, a sample stage which is provided in the reaction chamber and on which a borate is placed, and a hydrogen ion shielding member which is provided to cover at least some of the borate to be placed.

20 Claims, 2 Drawing Sheets

(a)

(b)

DEVICE AND METHOD FOR PRODUCING TETRAHYDROBORATE

TECHNICAL FIELD

The present disclosure relates to a device for producing a tetrahydroborate and a method for producing a tetrahydroborate.

BACKGROUND ART

As a method for producing a tetrahydroborate by hydrogenating a borate, a method of reacting sodium metaborate powder and magnesium powder for about 2 hours under a hydrogen atmosphere at about 550° C. and 2.3 MPa has been known (see, for example, Patent Literature 1). In addition, as another method, a method of reacting sodium metaborate powder and granular aluminum for about 1 hour under a hydrogen atmosphere at about 300° C. and 1 MPa, while rolling and grinding the granular aluminum has been known (see, for example, Patent Literature 2).

CITATION LIST

Patent Literature

Patent Literature 1: Japanese Unexamined Patent Publication No. 2004-224684
Patent Literature 2: International Publication WO 2015/190403

SUMMARY OF INVENTION

Technical Problem

In the techniques described in these patent literatures, it is necessary to maintain the atmosphere in a large capacity reaction chamber at a high temperature and a high pressure over 1 hour or longer and it is necessary to continuously input a large quantity of energy from the outside. Furthermore, in the techniques, since magnesium or aluminum as a reducing metal is consumed as a consumed material, in the case of using such a material in industrial application, a very costly process is included. Further, since the treatment time for one batch requires 1 hour or longer, problems arise in that productivity is not increased and such a material is not suitable for industrial application. As such, in the production field of a tetrahydroborate, it is a current situation that a satisfactory production method in view of industrial application has not been established.

The present disclosure is conceived in view of the above circumstances, and an object thereof is to provide novel device and method for producing a tetrahydroborate.

Solution to Problem

A device for producing a tetrahydroborate according to an embodiment of the present disclosure includes a reaction chamber inside which a hydrogen plasma is generated, a sample stage which is provided in the reaction chamber and on which a borate is placed, and a hydrogen ion shielding member which is provided to cover at least some of the borate to be placed.

In an embodiment, the hydrogen ion shielding member may have a mesh shape.

In an embodiment, the hydrogen ion shielding member may be formed by a metal.

In an embodiment, the hydrogen plasma may be generated using a raw material gas containing at least one of hydrogen gas and hydrocarbon gas.

In an embodiment, the hydrogen plasma may be a microwave plasma or an RF plasma.

A method for producing a tetrahydroborate according to an embodiment of the present disclosure includes a hydrogen radical treatment step of selectively exposing a borate to hydrogen radicals.

In an embodiment, the production method may further include a preheating step of heating the borate before the hydrogen radical treatment step.

In an embodiment, the hydrogen radical treatment step may be performed while heating the borate.

In an embodiment, the hydrogen radical treatment step may be performed while fluidizing the borate.

In an embodiment, an average particle diameter of the borate may be 500 μm or less.

In an embodiment, the borate may be sodium metaborate.

In an embodiment, the production method may further include a step of reacting a tetrahydroborate with water to obtain a borate before the hydrogen radical treatment step.

Advantageous Effects of Invention

According to the present disclosure, it is possible to provide novel device and method for producing a tetrahydroborate. The production method of the present disclosure can realize low cost and high productivity, and thus can be said to be very suitable for industrial application.

BRIEF DESCRIPTION OF DRAWINGS

FIG. 2a shows measurement results in the experimental example,
and FIG. 2b shows measurement results in the comparative experimental example.

DESCRIPTION OF EMBODIMENTS

Figure 1:
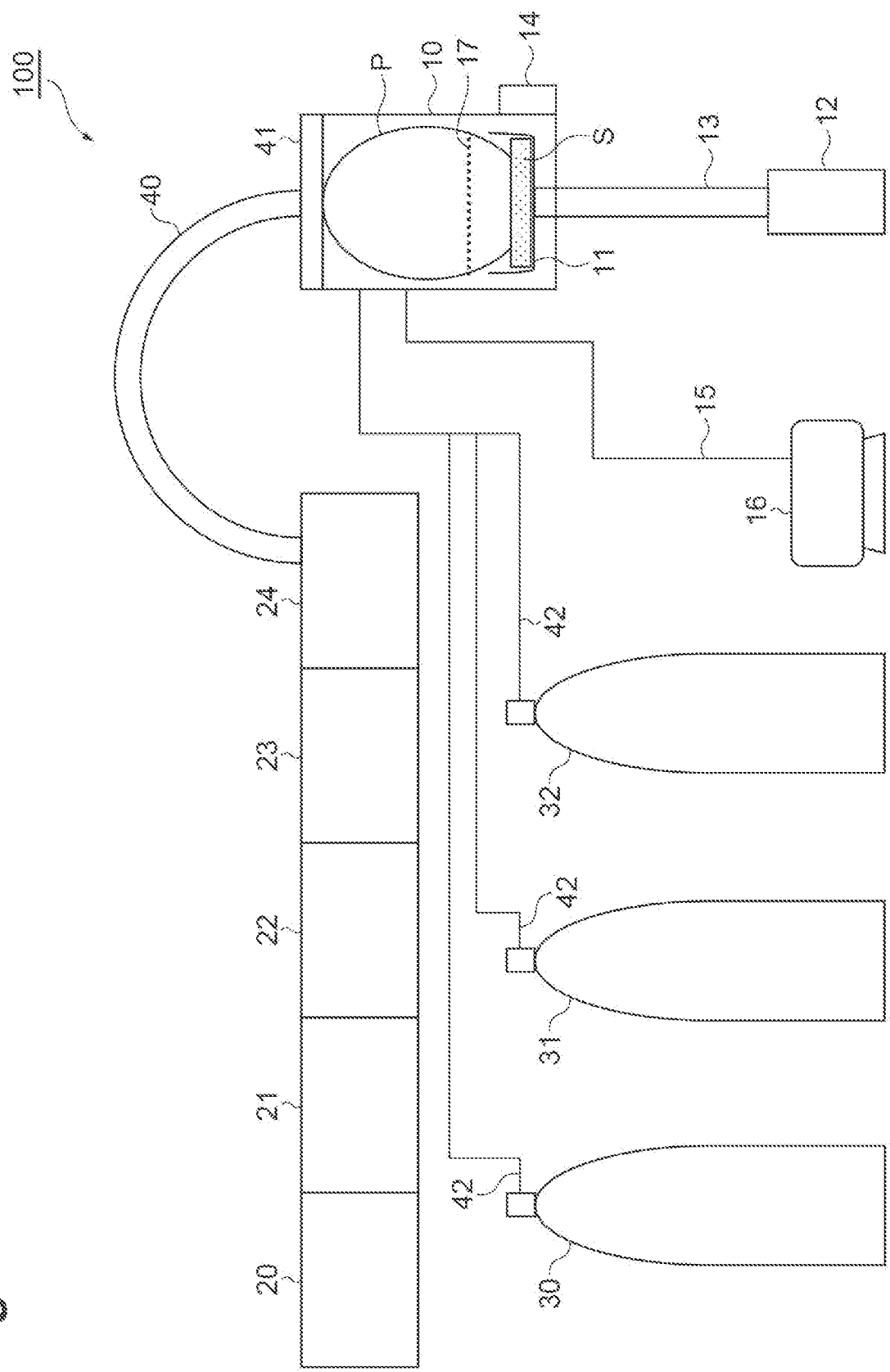
FIG. 1 is a schematic diagram illustrating an example of a device for producing a tetrahydroborate.

Hereinafter, embodiments of the present disclosure will be described in detail with reference to the drawings as necessary. However, the present disclosure is not limited to the following embodiments.

<Method for Producing Tetrahydroborate>

A method for producing a tetrahydroborate includes a hydrogen radical treatment step of selectively exposing a borate to hydrogen radicals.

(Hydrogen Radical Treatment Step)

In the hydrogen radical treatment step, the borate is treated with hydrogen radicals (H radicals) with high activity. At this time, the binding site of oxygen atoms of the borate is cleaved to remove the oxygen atoms and hydrogen atoms are bound to electron pairs to which the oxygen atoms are bound, so that the borate is hydrogenated. For example, in the case of using sodium metaborate as a borate, the following reaction (1) is considered to occur in this step.

$$NaBO_2 + 4H_2 \rightarrow NaBH_4 + 2H_2O \qquad (1)$$

In this step, upon producing a tetrahydroborate by hydrogenating the borate, it is not necessary to maintain a reaction chamber at a high temperature and a high pressure and it is not necessary to continuously input a large quantity of energy from the outside. Furthermore, by using the hydrogen radicals, the treatment time is considerably shortened as compared to a conventional process, and thus productivity can be improved. Therefore, it is possible to produce a large amount of a tetrahydroborate at a high speed by hydrogenating the borate.

In the hydrogen radical treatment step, a reducing metal (reductant) such as magnesium or aluminum is not indispensable. Therefore, the raw material cost on the reducing metal is not necessary, and much lower cost than that of the conventional process can be achieved. Furthermore, in the case of a hydrogenation process using a reducing metal such as magnesium or aluminum, a state in which the tetrahydroborate and a metal oxide (magnesium oxide or aluminum oxide) are mixed in the treated product obtained after the treatment is created. Therefore, in the conventional process indispensably using a reducing metal, a separation treatment for such a material is separately required so that problems arise in that not only the production cost is increased but also the production time is lengthened. On the other hand, according to the present production method, such problems do not arise. However, the above description is not intended to exclude the use of a reducing metal in the present embodiment.

Since the hydrogen radical treatment step can be performed using a plasma treatment device that is generally used in a semiconductor process or the like, both device cost and operational cost can be suppressed to be low.

As such, the production method according to the present embodiment including the hydrogen radical treatment step can be said to be suitable for industrial application.

The hydrogen radical treatment is different from a hydrogen plasma treatment of exposing a borate directly to a hydrogen plasma. In the hydrogen plasma, at least of respective particles of electrons, hydrogen ions, hydrogen radicals, hydrogen atoms, and hydrogen molecules exist. In the treatment of the borate, it is considered that hydrogen radicals (H radicals) and hydrogen ions with particularly high activity among those function to break the oxygen-boron bond in the borate so as to release oxygen and substitute hydrogen for oxygen. However, since hydrogen ions have a higher-than-necessary kinetic energy, the hydrogen ions tend to etch metal ions (for example, sodium ions) or boron ions constituting the salt so as to destroy the structure itself of the tetrahydroborate. In this regard, in the above-described hydrogen radical treatment, a borate is selectively exposed to hydrogen radicals. This treatment is preferably a treatment that is found with the intention of removing hydrogen ions from the hydrogen plasma and then causing only the hydrogen radicals having appropriate kinetic energy to act on the borate. That is, the treatment of selectively exposing a borate to hydrogen radicals can also be said to be a treatment of exposing a borate to a hydrogen plasma in which the amount of hydrogen ions is reduced or from which hydrogen ions are removed. The hydrogen radical treatment of selectively exposing a borate to hydrogen radicals can more efficiently produce a tetrahydroborate than the hydrogen plasma treatment of exposing a borate directly to a hydrogen plasma.

The hydrogen plasma that is used in the hydrogen radical treatment can be generated by using a gas containing hydrogen (H) as a constituent element, for example, a raw material gas containing at least one of hydrogen gas and hydrocarbon gas. Furthermore, $NH_3$ gas or the like can also be used. Note that, by using a gas containing an element, which is easier to oxidize than hydrogen, such as hydrocarbon ($CH_4$, $C_2H_2$, $C_6H_6$, or the like), the effect that the binding site of oxygen atoms of the borate is cleaved to remove the oxygen atoms can be further enhanced. Thereby, an increase in the speed at which the tetrahydroborate is produced is expected. For the same effect, a gas containing an element, which is easier to oxidize than hydrogen, such as carbon monoxide may be contained in the raw material gas. By using such a gas in combination with a gas containing hydrogen (H) as a constituent element, the effect that the binding site of oxygen atoms of the borate is cleaved to remove the oxygen atoms can be further enhanced. Note that, a gas, which causes the Penning effect by combination with hydrogen, such as argon gas, helium gas, or neon gas may be contained in the raw material gas. Thereby, since the hydrogen plasma concentration can be maintained to be high and the hydrogen plasma can be generated in a stable manner and in a wide range, an increase in the speed at which the tetrahydroborate is produced is expected. In order to generate a high-density hydrogen plasma, it is preferable to reduce the pressure of the raw material gas, for example, to about 5 to 150 Pa.

The hydrogen plasma may be any one of a microwave plasma (plasma excited by microwaves) and an RF plasma (plasma excited by radio frequency (RF)). These plasmas may be pulse-excited and may be DC-excited.

Since a wide range of high-density non-equilibrium hydrogen plasma is generated by using microwaves, the speed at which a tetrahydroborate is produced can be increased. Furthermore, since water generated by reaction of the oxygen atoms isolated from the borate with the hydrogen plasma can be effectively evaporated by heating or ionized by means of microwaves, it is possible to suppress that the produced tetrahydroborate is converted back to the borate by reaction with water. Thereby, the speed at which a tetrahydroborate is produced can be increased.

As the microwaves, for example, microwaves of which a frequency band can be used in the industry field and which are of a frequency of 1 GHz or more to enable a high-density non-equilibrium hydrogen plasma to be generated can be used, and suitably, microwaves of a frequency of 2.45 GHz can be used.

In the case of the microwave plasma, for example, the microwave power when generating the hydrogen plasma atmosphere can be set to 300 W or more. Furthermore, the time for subjecting the borate to the plasma treatment can be set to, for example, 1 hour or shorter and may be 0.5 hours or shorter although also depending on the amount of the borate or the plasma density.

On the other hand, the RF plasma is a plasma widely used in the industry field, and thus both device cost and operational cost can be suppressed to be low. Since a wide range of non-equilibrium hydrogen plasma is generated by the RF plasma, the speed at which a tetrahydroborate is produced can be increased. An excitation frequency used in generation of the RF plasma is generally 13.56 MHz in Japan in view of the law regulation.

The hydrogen radical treatment step can be performed while heating the borate. In this step, by the hydrogen radical treatment with respect to the borate, oxygen isolated from the borate is reacted with the hydrogen plasma to generate water. Therefore, by performing the hydrogen radical treatment while heating the borate, it is easy to further suppress that the generated water is reacted with the tetrahydroborate generated by hydrogenation of the borate. Note that, in the case of using the microwave plasma as described above, this effect can also be obtained by the microwaves. The heating temperature can be set to 40° C. to 350° C.

The plasma that is used in the hydrogen radical treatment may be an equilibrium plasma. Thereby, the hydrogen plasma density and the ion temperature can be increased, and thus the effect that the binding site of oxygen atoms of the borate is cleaved to isolate the oxygen atoms is enhanced. Thereby, the speed at which a tetrahydroborate is produced can be increased. Furthermore, since water generated by the binding of the oxygen atoms isolated from the borate with the hydrogen plasma can be effectively evaporated or ionized by high energy, it is possible to suppress that the produced tetrahydroborate is converted back to the borate by reaction with water. Thereby, the speed at which a tetrahydroborate is produced can be increased.

The hydrogen radical treatment step can be performed while fluidizing the borate. Thereby, a metaborate can be thoroughly treated with the hydrogen radicals.

The borate may be subjected to the hydrogen radical treatment along with a reductant. Examples of the reductant include reducing metal powder such as magnesium (magnesium-based materials), aluminum (aluminum-based materials), and iron (iron-based materials), and carbon powder. Thereby, the oxygen atoms isolated from the borate by the hydrogen radical treatment are trapped, and it is easy to suppress generation of water by reaction of the oxygen atoms and the hydrogen plasma. After the hydrogen radical treatment, depending on circumstances, a step of separating the tetrahydroborate from impurities (mainly, a metal oxide) derived from the reductant is required, but the action of the reductant makes it easy to suppress generation of water by the hydrogen radical treatment, so that the treatment efficiency itself can be improved.

The borate may be subjected to the hydrogen radical treatment along with a hygroscopic agent. Examples of the hygroscopic agent include quicklime, silica gel, bentonite, magnesium chloride, and calcium chloride. Thereby, since water generated by the hydrogen radical treatment as described above can be removed, the treatment efficiency can be further improved.

(Preheating Step)

The production method according to the present embodiment may further include a preheating step of heating the borate before the hydrogen radical treatment step. By this step, water contained as crystallization water in a borate hydrate can be removed in advance. Therefore, unnecessary moisture content is not present in the hydrogen radical treatment step, the treatment efficiency can be improved, and the speed at which a tetrahydroborate is produced can be increased.

The preheating step can be performed, for example, under the condition of a temperature of 40° C. to 350° C. for 0.1 to 2 hours although depending on the type and amount of the borate.

(Borate Preparation Step)

The production method according to the present embodiment may further include a step of reacting a tetrahydroborate with water to obtain a borate before the hydrogen radical treatment step (and in the case of providing the preheating step, before the preheating step). The tetrahydroborate is used as a hydrogen carrier, water is added to the tetrahydroborate in a hydrogen demand site to extract hydrogen and use the extracted hydrogen, and then the borate that is the residue generated in the chemical reaction is returned to a hydrogen supply site to perform hydrogenation again, so that the tetrahydroborate can be reproduced. Since dehydrogenation and re-hydrogenation are caused to repeatedly occur so that hydrogen can be transported and stored, the hydrogen can be transported and stored at a low cost. For example, in the case of using sodium tetrahydroborate as a tetrahydroborate, the following reaction (2) is considered to occur in this step.

$$NaBH_4 + 2H_2O \rightarrow NaBO_2 + 4H_2 \quad (2)$$

<Borate and Tetrahydroborate>
(Borate)

Examples of the borate include borates such as a metaborate, a tetraborate, and a pentaborate. Examples of the metaborate include $NaBO_2$, $KBO_2$, $LiBO_2$, $Ca(BO_2)_2$, and $Mg(BO_2)_2$. Examples of the tetraborate include $Na_2B_4O_7$, $Na_2O \cdot 2BO_3$, $K_2O \cdot B_2O_3$, $Li_2B_4O_7$, and $Mg_3B_4O_9$. Examples of the pentaborate include $NaB_5O_8$, $Na_2O \cdot 5B_2O_3$, $KB_5O_8$, $K_2O \cdot 5B_2O_9$, and $LiB_5O_8$. Furthermore, $Na_2B_4O_7 \cdot 10H_2O$, $Na_2B_4O_7 \cdot 4H_2O$, $Ca_2B_6O_{11} \cdot 5H_2O$, $CaNaB_5O_9 \cdot 6H_2O$, $Mg_7Cl_2B_{17}O_{30}$, and the like that are natural borate minerals can also be used. From the viewpoint of ease of acquisition, acquisition cost, chemical stability, ease of hydrogen desorption, hydrogen storage density, and the like, sodium metaborate may be used as a borate.

From the viewpoint of further improving the hydrogen radical treatment efficiency, the borate can be in the form of powder. At this time, the average particle diameter of the borate can be set to 500 μm or less, and may be 100 μm or less. The lower limit is not particularly limited, but can be set to 5 μm.

(Tetrahydroborate)

Examples of the tetrahydroborate include hydrides corresponding to the borates exemplified above. For example, in the case of using a metaborate as a borate, $NaBH_4$, $KBH_4$, $LiBH_4$, $Ca(BH_4)_2$, $Mg(BH_4)_2$, and the like are exemplified.

In this regard, however, the tetrahydroborate obtained by the production method according to the present embodiment includes a tetrahydroborate having a composition represented by the following General Formula (A) or (B):

$$M_xB_yH_z \quad (A)$$

$$N_sB_tH_u \quad (B)$$

In Formula (A), "M" is at least one selected from the group consisting of Li, Na, and K, "x" is 0.05 or more and less than 1.0 and may be 0.5 or more and less than 1.0, "y" is 0.6 or more and less than 1.0, and "z" is 4.0. In Formula (B), "N" is at least one selected from the group consisting of Ca and Mg, "s" is 0.05 or more and less than 1.0 and may be 0.5 or more and less than 1.0, "t" is 1.2 or more and less than 2.0, and "u" is 8.0.

As described above, with the production method according to the present embodiment, it is possible to obtain a tetrahydroborate having a composition that is deviated from the stoichiometric composition. The reason for this is not certain; however, it is speculated that by using the hydrogen plasma (hydrogen radicals) at the time of hydrogenation, a phenomenon that some elements (Li, Na, K, Ca, Mg, and the like) in the borate are ejected to the outside by particles constituting the plasma may occur.

Note that, since such a tetrahydroborate exists in a hydrogen-radical-treated product (mixture) of the borate, it is possible to detect whether or not a tetrahydroborate is a product obtained through the hydrogen radical treatment by composition analysis of the tetrahydroborate. That is, the tetrahydroborate having the composition represented by the above Formulae (A) and (B) can be used as a marker at the time of detection.

<Device for Producing Tetrahydroborate>

A device for producing a tetrahydroborate includes a reaction chamber inside which a hydrogen plasma is generated, a sample stage which is provided in the above-described reaction chamber and on which a borate is placed, and a hydrogen ion shielding member which is provided to cover at least some of the above-described borate to be placed. By using this production device, it is possible to perform a method for producing a tetrahydroborate, the method including a hydrogen radical treatment step of selectively exposing a borate to hydrogen radicals.

FIG. 1 is a schematic diagram illustrating an example of a device for producing a tetrahydroborate. A device 100 illustrated in FIG. 1 includes a borate treatment mechanism including a reaction chamber 10 which is designed to be capable of adjusting atmosphere and pressure, a sample stage 11 which is provided in the reaction chamber 10 and on which a borate S can be placed, a hydrogen ion shielding member 17 which is provided to cover at least some of the borate S in the reaction chamber 10, an infrared heating device 12 which is provided outside the reaction chamber 10 and is used for heating the sample stage 11, a conductive glass rod 13 which is used for conducting infrared rays from the infrared heating device 12 to the sample stage 11, a vibration generator 14 which is used for fluidizing the borate S in the sample stage 11, and a vacuum pump 16 which is attached through a pipe 15 to the reaction chamber 10 and can exhaust the atmosphere in the reaction chamber 10; a microwave generation mechanism including a microwave generator 20, an isolator 21, a power monitor 22, a tuner 23, and a rectangular coaxial waveguide converter 24; and a raw material gas supply mechanism including a hydrocarbon gas cylinder 30, a hydrogen gas cylinder 31, and a hydrogen mixed gas cylinder 32.

Furthermore, the device 100 includes a flexible coaxial waveguide 40, which conducts microwaves oscillated from the microwave generation mechanism to the boric acid treatment mechanism, a quartz plate (dielectric substance) 41, which is provided between the flexible coaxial waveguide 40 and the reaction chamber 10 and through which microwaves can propagate while shielding atmosphere, and a pipe 42, which supplies a raw material gas supplied from the raw material gas supply mechanism to the borate treatment mechanism.

In the reaction chamber 10, a plasma P is generated by reducing the pressure of the introduced raw material gas to a predetermined pressure and by collisional ionization of electrons accelerated by the electric field of the microwaves and the raw material gas molecules. At least some of hydrogen ions contained in the generated plasma P are shielded (removed) by the hydrogen ion shielding member 17 between the quartz plate 41 and the sample stage 11, strictly speaking, between the quartz plate 41 and the borate S. In this meaning, the hydrogen ion shielding member 17 can be said to be a member that inhibits exposure of the borate S directly to the plasma P. On the other hand, hydrogen radicals contained in the generated plasma P are not shielded by the hydrogen ion shielding member 17 and are reached to the borate S. Thereby, the borate is selectively treated with hydrogen radicals so that a tetrahydroborate can be obtained.

For example, a case where the hydrogen ion shielding member 17 is a mesh made of a metal will be described. The hydrogen ion shielding member 17 is placed to be in contact with the edge of the sample stage 11, and the sample stage 11 is further in contact with the reaction chamber 10. Since the reaction chamber 10 is grounded, the hydrogen ion shielding member 17 is in a state of being grounded through the sample stage 11 and the reaction chamber 10. Since the hydrogen ions have a positive electrical charge, the hydrogen ions are trapped so as to be drawn to the grounded mesh and are more difficult to enter the sample stage 11 side than the mesh. On the other hand, since the hydrogen radicals do not have an electrical charge, the hydrogen radicals pass through openings of the mesh and are reached to the borate S on the sample stage 11. Note that, the hydrogen ion shielding member 17 is provided between a plasma source (a microwave source in the reaction chamber 10) and the borate S and can be provided such that the hydrogen ion shielding member can completely shield a range in which both this plasma source and the borate S can be connected by a straight line.

On the other hand, in a case where the hydrogen ion shielding member 17 is a member not having openings such as the mesh, procedure of the hydrogen ions is inhibited by the hydrogen ion shielding member 17 provided on the upper part of the sample stage 11, and thus the hydrogen ions are difficult to be reached to the borate S. On the other hand, the hydrogen radicals can come around a side of the hydrogen ion shielding member 17 and can be reached to the borate S.

The shape of the hydrogen ion shielding member is not particularly limited, and may be a mesh shape, a slit shape, a plate shape having array holes (a so-called punching metal or perforated board), a plate shape, or a bulk material shape. Among these shapes, from the viewpoint that, while hydrogen ions that are electrically charged particles are selectively trapped, hydrogen radicals are easily transmitted, particularly, a mesh-shaped shielding member can be used.

The materials for the hydrogen ion shielding member are not particularly limited, and the hydrogen ion shielding member may be formed by a conductive material (a metal, carbon, a metallic composite, a carbon composite, or the like) or a non-conductive material (glass, ceramics, a resin, paper, wood, or the like). Among these materials, from the viewpoints of being inexpensive, resistant to plasma, and easy-to-process and of easily and selectively trapping hydrogen ions that are electrically charged particles by being grounded, particularly, a shielding member formed by a metal (especially, a stainless steel material) can be used.

From the above description, a mesh made of a metal (especially, a stainless steel mesh) can be used as the hydrogen ion shielding member.

The above-described hydrogen plasma is as described in the section of the method for producing a tetrahydroborate.

EXAMPLES

Hereinafter, the present disclosure will be described in more detail by means of experimental examples, but the present disclosure is not limited to these examples.

Experimental Example

A tetrahydroborate was produced using the device illustrated in FIG. 1. As a borate, $NaBO_2 \cdot 4H_2O$ (sodium metaborate tetrahydrate: manufactured by KISHIDA CHEMICAL Co., Ltd., content: 98% by mass) was prepared. This borate was heated at 350° C. for 2 hours while being subjected to a pulverization treatment by a ball mill to remove crystallization water, thereby obtaining powdery $NaBO_2$ (anhydrous sodium metaborate). The average particle diameter of the powdery $NaBO_2$ was 100 μm. The average particle diameter was measured by a digital microscope.

Then, 1.0 g of the powdery $NaBO_2$ (sample S) was weighed and placed on the sample stage 11, and the sample stage 11 was placed in the reaction chamber 10. As the reaction chamber 10, a reaction chamber having a capacity of 2.5 L was used. Furthermore, a stainless steel mesh (SUS304, 60 mesh) was provided as the hydrogen ion shielding member 17 on the upper part of the sample stage 11. The inside of the reaction chamber 10 was evacuated until the pressure became $10^{-4}$ Pa, and hydrogen gas and acetylene gas were adjusted to have flow rates of 99 sccm and 1 sccm, respectively, and then supplied into the reaction chamber 10. Then, the exhaust rate was adjusted so that the pressure in the reaction chamber 10 was maintained at 9 Pa. The power of the infrared heating device 12 was turned on, and the sample S was heated to 160° C. through the conductive glass rod 13 and the sample stage 11.

The power of the microwave generator 20 was turned on, and microwaves of a frequency of 2.45 GHz were allowed to be incident in the reaction chamber 10. At this time, the microwave reflected power was adjusted by the tuner 23 so as to be minimized. The microwave incident power was 500 W and the microwave reflected power was 70 W. The hydrogen plasma excited by the microwaves was generated in the reaction chamber 10. The sample S placed on the sample stage 11 was selectively treated with hydrogen radicals contained in the hydrogen plasma. During the treatment, the vibration was applied to the sample stage 11 by the vibration generator 14 to fluidize the sample S. The treatment time was set to 30 minutes. The distance from the plasma source (the microwave source in the reaction chamber 10) to the sample stage 11 was 60 mm, and the distance from the plasma source to the hydrogen ion shielding member 17 was 50 mm.

After the above-described predetermined treatment time elapsed, the power of each of the microwave generator 20, the vibration generator 14, and the infrared heating device 12 was turned off and the supply of the hydrogen gas was stopped. Thereafter, the reaction chamber 10 was opened to the atmosphere and a sample treated with hydrogen radicals was extracted.

Comparative Experimental Example

Production of a tetrahydroborate was performed in the same manner as in the above-described experimental example, except that the hydrogen ion shielding member 17 was not used. Thereby, a sample treated with a hydrogen plasma was obtained.

(Evaluation)

The infrared absorption spectrum of the sample obtained after the hydrogen radical treatment was measured using a Fourier transform infrared spectrophotometer FT/IR-6300 (manufactured by JASCO Corporation, product name). As a result of the measurement, the peak of B—O bond derived from anhydrous sodium metaborate was decreased and the peak of B—H bond derived from sodium tetrahydroborate was increased. Thereby, it was confirmed that sodium tetrahydroborate was obtained by the hydrogen radical treatment with respect to anhydrous sodium metaborate.

Furthermore, the crystalline structure of the sample obtained after the hydrogen radical treatment was analyzed by XRD. Sodium tetrahydroborate having a composition of $Na_{0.8}B_{0.95}H_{4.0}$ was contained in the obtained sample.

Figure 2:
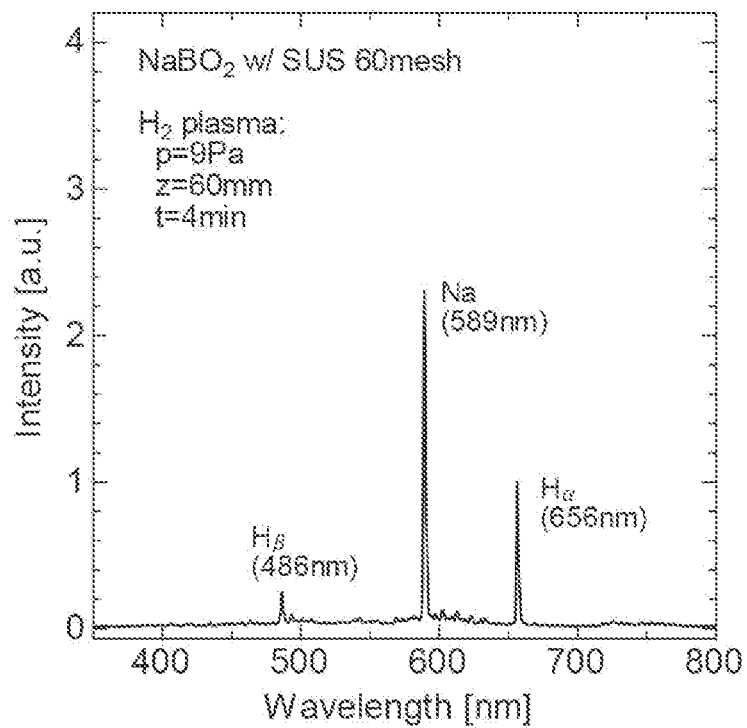
FIG. 2 shows results of plasma emission spectrum measurement in a hydrogen radical treatment step in an experimental example and a comparative experimental example.
Figure 2:
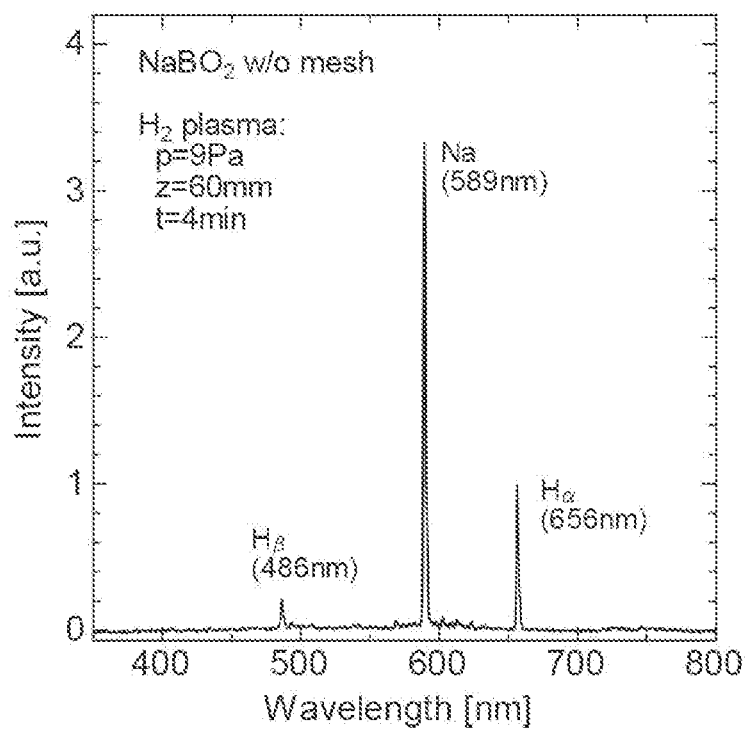

Plasma emission spectrum measurement in the hydrogen radical treatment step in the experimental example and the comparative experimental example was performed. Measurement results are shown in FIG. 2. FIG. 2a shows measurement results in the experimental example, and FIG. 2b shows measurement results in the comparative experimental example. When the emission intensity of Hα was normalized as "1", the emission intensity of D-line that is the atomic spectrum of Na was lowered (to 2.28 from 3.12) in the experimental example as compared to the comparative experimental example. Note that, both of FIG. 2a and FIG. 2b show results of plasma emission spectrum measurement at the time point at which 4 minutes elapsed from the start of the hydrogen radical treatment.

Furthermore, respective hydrogenation rates were calculated as described below, and it was found that the hydrogenation rate of the experimental example was improved 1.93 times as compared to the comparative experimental example.

Hydrogenation rate (%)={Amount (g) of hydrogen generated when a sample obtained after the hydrogen radical treatment (or after the hydrogen plasma treatment) was reacted with water/Theoretical amount (g) of hydrogen generated when a sample was reacted with water in a case where the sample was completely converted from a borate to sodium borohydride}×100

REFERENCE SIGNS LIST

10: reaction chamber, 11: sample stage, 12: infrared heating device, 13: conductive glass rod, 14: vibration generator, 15: pipe, 16: vacuum pump, 17: hydrogen ion shielding member, 20: microwave generator, 21: isolator, 22: power monitor, 23: tuner, 24: rectangular coaxial waveguide converter, 30: hydrocarbon gas cylinder, 31: hydrogen gas cylinder, 32: hydrogen mixed gas cylinder, 40: flexible coaxial waveguide, 41: quartz plate (dielectric substance), 42: pipe, 100: device for producing tetrahydroborate, P: plasma, S: borate.

The invention claimed is:

1. A device for producing a tetrahydroborate, the device comprising:
    a reaction chamber inside which a hydrogen plasma is generated;
    a sample stage which is provided in the reaction chamber and on which a borate is placed; and
    a hydrogen ion shielding member which is provided to cover at least some of the borate to be placed.

2. The device according to claim 1, wherein the hydrogen ion shielding member has a mesh shape.

3. The device according to claim 1, wherein the hydrogen ion shielding member is formed by a metal.

4. The device according to claim 1, wherein the hydrogen plasma is generated using a raw material gas containing at least one of hydrogen gas and hydrocarbon gas.

5. The device according to claim 1, wherein the hydrogen plasma is a microwave plasma or an RF plasma.

6. A method for producing a tetrahydroborate, the method comprising a hydrogen radical treatment step of in the device for producing a tetrahydroborate according to claim 1.

7. The method according to claim 6, further comprising a preheating step of heating the borate before the hydrogen radical treatment step.

8. The method according to claim 6, wherein the hydrogen radical treatment step is performed while heating the borate.

9. The method according to claim 6, wherein the hydrogen radical treatment step is performed while fluidizing the borate.

10. The method according to claim 6, wherein an average particle diameter of the borate is 500 μm or less.

11. The method according to claim 6, wherein the borate is sodium metaborate.

12. The method according to claim 6, further comprising a borate preparation step of reacting a tetrahydroborate with water to obtain a borate before the hydrogen radical treatment step.

13. The method according to claim 7, wherein the hydrogen radical treatment step is performed while heating the borate.

14. The method according to claim 7, wherein the hydrogen radical treatment step is performed while fluidizing the borate.

15. The method according to claim 8, wherein the hydrogen radical treatment step is performed while fluidizing the borate.

16. The method according to claim 7, wherein an average particle diameter of the borate is 500 μm or less.

17. The method according to claim 8, wherein an average particle diameter of the borate is 500 μm or less.

18. The method according to claim 9, wherein an average particle diameter of the borate is 500 μm or less.

19. The method according to claim 7, wherein the borate is sodium metaborate.

20. The method according to claim 8, wherein the borate is sodium metaborate.

* * * * *